United States Patent
Cheng et al.

(10) Patent No.: US 10,837,546 B2
(45) Date of Patent: Nov. 17, 2020

(54) SENSING SYSTEM FOR SENSING A POSITION OF A GEAR SHAFT

(71) Applicant: Tyco Electronics (Shanghai) Co. Ltd., Shanghai (CN)

(72) Inventors: Dawei Cheng, Shanghai (CN); Haizhou Lu, Shanghai (CN)

(73) Assignee: Tyco Electronics (Shanghai) Co. Ltd., Shanghai (CN)

(*) Notice: Subject to any disclaimer, the term of this patent is extended or adjusted under 35 U.S.C. 154(b) by 11 days.

(21) Appl. No.: 15/983,476

(22) Filed: May 18, 2018

(65) Prior Publication Data
US 2018/0335131 A1 Nov. 22, 2018

(30) Foreign Application Priority Data

May 18, 2017 (CN) .......................... 2017 1 0354015

(51) Int. Cl.
*F16H 59/70* (2006.01)
*G01D 5/14* (2006.01)
*F16H 59/68* (2006.01)

(52) U.S. Cl.
CPC .............. *F16H 59/70* (2013.01); *G01D 5/145* (2013.01); *F16H 2059/6823* (2013.01); *F16H 2059/708* (2013.01)

(58) Field of Classification Search
CPC ......... H04L 1/00; H04L 2201/00; G05B 1/00; G05B 2219/00; H04B 1/00; H04B 2201/00; F16H 1/00
See application file for complete search history.

(56) References Cited

U.S. PATENT DOCUMENTS

| 4,712,420 A * | 12/1987 | Johansson .............. G01D 5/145 116/20 |
| 2002/0130657 A1* | 9/2002 | Li .......................... G01D 5/147 324/207.21 |
| 2006/0283276 A1* | 12/2006 | Komatsu ............... F16H 59/105 74/335 |

(Continued)

*Primary Examiner* — Jermele M Hollington
*Assistant Examiner* — Temilade S Rhodes-Vivour
(74) *Attorney, Agent, or Firm* — Barley Snyder

(57) ABSTRACT

The present disclosure discloses a sensing system for sensing a position of a gear shaft. In the present disclosure, a magnet apparatus is provided on the gear shaft, where the magnet apparatus includes, along a rectilinear motion direction, a first length region magnet and a second length region magnet, the second length region magnet including a first portion and a second portion, a magnetic field of the second portion of the second length region magnet corresponding to a reverse gear position being different from that of the first length region magnet and that of the first portion of the second length region magnet. An actually induced electrical signal generated by sensing the motion of the magnet apparatus is different from a reference inductive electrical signal of a corresponding position of a reference magnet. The processing unit compares the inductive electrical signal generated by sensing the motion of the magnet apparatus against a simulated inductive electrical signal and determines whether the gear shaft is at a reverse gear position or a forward gear position based on a difference from the comparison.

15 Claims, 13 Drawing Sheets

(56) References Cited

U.S. PATENT DOCUMENTS

| | | | |
|---|---|---|---|
| 2007/0137337 A1* | 6/2007 | Kim | F16H 59/0204 |
| | | | 74/335 |
| 2007/0216402 A1* | 9/2007 | Blessing | F16H 59/70 |
| | | | 324/207.24 |
| 2010/0294067 A1* | 11/2010 | Bak | F16H 59/0204 |
| | | | 74/473.12 |
| 2011/0148398 A1* | 6/2011 | Yang | F16H 59/044 |
| | | | 324/207.11 |
| 2012/0152049 A1* | 6/2012 | Benson | F16H 59/044 |
| | | | 74/473.3 |
| 2015/0123652 A1* | 5/2015 | Hernandez-Oliver | |
| | | | G01D 5/145 |
| | | | 324/207.13 |

* cited by examiner

SENSING SYSTEM FOR SENSING A POSITION OF A GEAR SHAFT

CROSS-REFERENCE TO RELATED APPLICATION

This application claims the benefit of the filing date under 35 U.S.C. § 119(a)-(d) of Chinese Patent Application No. 201710354015.1, filed May 18, 2017.

FIELD OF INVENTION

The present disclosure relates to the field of automobile control, and more particularly relates to a Hall element-based sensor for sensing a gear shaft position.

BACKGROUND OF INVENTION

Currently, position sensors have been widely applied in various industrial fields, e.g., the field of automotive control. Position sensing systems are already known in the art for sensing a position of a gear shaft.

Specifically, to save fuel, after a gear shaft of a vehicle has been at the neutral gear position for a certain time period (e.g., 5 seconds), the ECU (Electronic Control Unit) will generate a Stop control signal to automatically shut down the engine of the vehicle. Then, when the ECU receives a signal indicating that the vehicle clutch pedal is stepped on, if the gear shaft is still at the neutral gear position, the ECU will generate a Start control signal to automatically start the engine of the vehicle. Therefore, the control circuit of the vehicle needs a position sensing system to detect the neutral gear position of the gear shaft.

In addition, for the sake of driving safety, when the vehicle gear shaft moves to the reverse gear position, it is needed to turn on a reverse lamp or activate a voice device to alert surrounding pedestrians that the vehicle is in a reverse driving state. Therefore, the control circuit of the vehicle needs a position sensing system to detect a reverse gear position of the gear shaft.

Traditionally, two position sensing systems are needed to implement detecting of the neutral gear position and the reverse gear position of the gear shaft, which require two sets of magnets and two sets of circuitry elements and mechanical elements, incurring a high manufacturing cost. Moreover, with the two sets of circuitry elements and mechanical elements, there would be higher failure rate.

Therefore, it is necessary to provide an improved position sensing apparatus that may reduce the manufacturing cost and lower the failure rate.

SUMMARY OF INVENTION

In view of the drawbacks above, the present disclosure intends to provide an improved sensing system, which may not only effectively sense a gear shaft position but also lower the manufacturing cost and the failure rate. A specific technical solution is provided below:

A sensing system for sensing a position of a gear shaft, the gear shaft being provided, in its axial direction, with a plurality of groups of gear positions, the plurality of groups of gear positions including a plurality of neutral gear positions arranged along the axial direction of the gear shaft and a plurality of pairs of motion gear positions oppositely arranged at two sides of the neutral gear positions, one of the motion gear positions being a reverse gear position, while the remaining being forward gear positions, the sensing system comprising:

a sensing magnet that is fixedly arranged on the gear shaft and moves with the gear shaft, wherein the sensing magnet is axially partitioned into a first length region magnet and a second length region magnet, the second length region magnet being partitioned, along a transverse direction thereof, into a first portion and a second portion, the first length region magnet having a polarity identical to that of the first portion of the second length region magnet, but different from that of the second portion of the second length region magnet, or no magnet being provided for the second portion of the second length region magnet; and a sensing unit arranged to sense a magnetic field change of the sensing magnet when the sensing magnet moves with the gear shaft and to generate a corresponding inductive electrical signal, the inductive electrical signal being compared against a pre-determined reference inductive electrical signal to indicate whether the gear shaft is at a forward gear position or a reverse gear position.

In an embodiment of the present disclosure, the first length region magnet generates a first form of magnetic field change; the second length region magnet generates a second form of magnetic field change; the sensing unit senses the first form of magnetic field change and the second form of magnetic field change when the sensing apparatus moves with the gear shaft, and generates the inductive electrical signal.

In an embodiment of the present disclosure, the sensing system further comprises: a memory unit configured for storing the reference inductive electrical signal sensed by the sensing unit when a reference magnet moves with the gear shaft; a processing unit configured for receiving the inductive electrical signal and comparing the received inductive electrical signal against the reference inductive electrical signal to determine a gear position where the gear shaft is located.

In an embodiment of the present disclosure, when a difference between the inductive electrical signal and the reference inductive electrical signal is smaller than or equal to a threshold, it is determined that the gear shaft is at a forward gear position; when the difference between the inductive electrical signal and the reference inductive electrical signal is greater than the threshold, it is determined that the gear shaft is at a reverse gear position.

In an embodiment of the present disclosure, when a difference between the inductive electrical signal and the reference inductive electrical signal is smaller than or equal to a threshold, it is determined that the gear shaft is at a forward gear position.

In an embodiment of the present disclosure, the reference inductive electrical signal includes a maximum value reference inductive electrical signal; when a difference between the inductive electrical signal and the maximum value reference inductive electrical signal is greater than the threshold, it is determined that the gear shaft is at a reverse gear position.

In an embodiment of the present disclosure, the reference inductive electrical signal has a signal reference value, and different signal reference values represent a plurality of forward gear positions and the reverse gear position.

In an embodiment of the present disclosure, the sensing system further comprises: an indicating circuit connected to the processing unit; wherein when the processing unit determines that the gear shaft is at a forward gear position, the processing unit sets the indicating circuit to a first state;

when the processing unit determines that the gear shaft is at the reverse gear position, the processing unit sets the indicating circuit to a second state.

In an embodiment of the present disclosure, magnetic field directions of the first length region magnet and the first portion of the second length region magnet at a side in contact with the gear shaft are a first polarity, while magnetic field directions thereof at a side distant from the gear shaft are a second polarity; a magnetic field direction of the second portion of the second length region magnet at a side in contact with the gear shaft is the second polarity, while the magnetic field direction thereof at a side distant from the gear shaft is the first polarity.

In an embodiment of the present disclosure, magnetic field directions of the first length region magnet and the first portion of the second length region magnet at a side in contact with the gear shaft are the first polarity, while magnetic field directions thereof at a side distant from the gear shaft are the second polarity; the second portion of the second length region magnet is absent of magnet or provided with a non-magnetic material.

In an embodiment of the present disclosure, the sensing magnet is an integrally formed part.

In an embodiment of the present disclosure, the first length region magnet and the first portion of the second length region magnet are of an integral structure.

In an embodiment of the present disclosure, the sensing unit is a separate Hall sensing unit.

In an embodiment of the present disclosure, the sensing unit is a Hall sensing unit.

In an embodiment of the present disclosure, the sensing unit is a three-axle Hall sensing unit.

In an embodiment of the present disclosure, the reference magnet is the first length region magnet.

In an embodiment of the present disclosure, the plurality of groups of gear positions are three pairs of gear positions, which are:

first pair of gear positions: $1^{st}$ gear position and $2^{nd}$ gear position;

second pair of gear positions: $3^{rd}$ gear position and $4^{th}$ gear position;

third pair of gear positions: $5^{th}$ gear position and R gear position; and wherein the $1^{st}$ gear position, $2^{nd}$ gear position, $3^{rd}$ gear position, $4^{th}$ gear position, and $5^{th}$ gear position are forward gear positions, and the R gear position is the reverse gear position.

In an embodiment of the present disclosure, the first length region magnet and the second length region magnet are sequentially arranged along the axial direction of the gear shaft.

In an embodiment of the present disclosure, the sensing magnet is an integrally formed part.

In an embodiment of the present disclosure, the sensing unit is arranged relative to the sensing magnet such that: when the gear shaft is at a selected neutral position, the sensing unit aligns with the sensing magnet along a radial direction of the gear shaft.

In an embodiment of the present disclosure, the first length region magnet and the first portion of the second length region magnet have a same polarity that is different from that of the second portion of the second length region magnet.

In an embodiment of the present disclosure, the second portion of the second length region magnet is not provided with a magnet.

In an embodiment of the present disclosure, the second portion of the second length region magnet is absent of magnet or provided with a non-magnetic material.

The prior art uses a neutral gear position sensor to sense and output a neutral gear position. However, it is difficult for such sensor to distinguish between the forward gear positions and the reverse gear position and thus needs an extra sensor to distinguish the reverse gear position.

In the present disclosure, a magnet is partitioned into a first length region magnet and a second length region magnet, wherein the second length region magnet is further partitioned into a first portion and a second portion, a polarity of the second portion being reversed (or absent of magnet) and corresponding to the reverse gear position, such that the actual inductive electrical signal is different from the reference inductive electrical signal of the reference magnet at a corresponding position, thereby distinguishing between the inductive electrical signal when the gear shaft is at the reverse gear position and the inductive electrical signal when the gear shaft is at the forward gear position; in this way, the reverse gear position of the gear shaft is reliably indicated.

When the gear shaft is at the neutral gear position, the sensing system according to the present disclosure computes that the inductive electrical signal is within the neutral gear position reference inductive electrical signal range, thereby generating a neutral gear position signal.

By arranging only one magnet and one set of circuitry mechanical elements to sense a position of the gear shaft, the sensing system according to the present disclosure effectively implements detecting of the neutral gear position and the reverse gear position of the gear shaft, which reduces the manufacturing cost and lowers the failure rate. Further, the present disclosure is compatible with the original mechanical design without changing the structural components, sizes and shapes currently designed, and the technical effect of the present disclosure is achieved by only changing the magnet structure.

BRIEF DESCRIPTION OF THE DRAWINGS

Hereinafter, the present disclosure will be described in further detail with reference to the accompanying drawings.

DETAILED DESCRIPTION OF EMBODIMENTS

Figure 1:
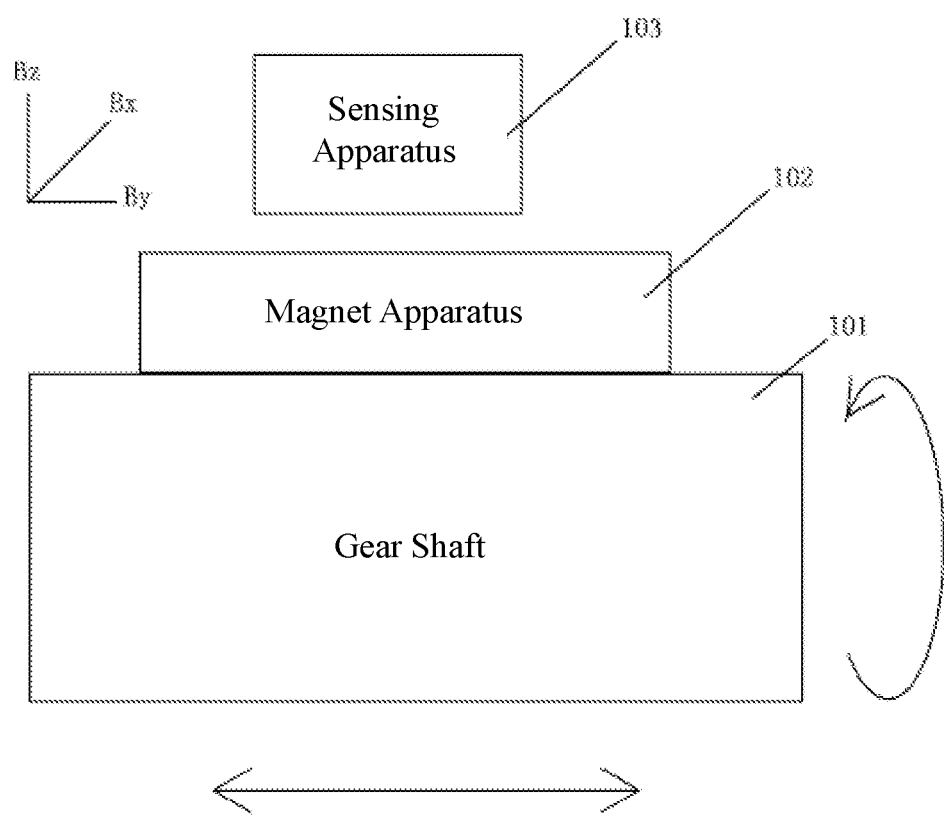
FIG. 1 is a side view of a sensing system of the present disclosure.

Hereinafter, various embodiments of the present disclosure will be described with reference to the accompanying drawings constituting a part of the specification. It should be understood that although terms indicating directions, such as "front," "rear," "up," "down," "left," "right," are used in the present disclosure to describe various exemplary structural parts and elements of the present disclosure, these terms are only determined based on the exemplary orientations shown in the figures for the convenience of illustration. Because the embodiments disclosed by the present disclosure may be set according to different directions, these terms indicating direction are only used for illustration, not for limiting. In possible circumstances, same or like reference numerals used in the present disclosure refer to the same parts.

FIG. 1 is a side view of a sensing system of the present disclosure.

As illustrated in FIG. 1, a sensing system 100 comprises a magnet apparatus 102 and a sensing apparatus 103. The magnet apparatus 102 is mounted on a gear shaft 101; the sensing apparatus 102 is fixedly disposed above the magnet apparatus 102 and is spaced from the magnet apparatus 102 with a certain distance or interval. The gear shaft 101 may make a rectilinear motion and a rotary motion along its own axis; the magnet apparatus 102 makes a rectilinear motion and a rotary motion with the gear shaft 101. When the gear shaft 101 is making a rectilinear motion, the gear shaft is at a neutral gear position; when the gear shaft 101 is making a rotary motion, the gear shaft moves to a corresponding forward gear position or the reverse gear position. When the magnet apparatus 102 moves with the gear shaft 101, the magnet apparatus 102 may produce a magnetic induction strength change with respect to the position (or detected position) of the sensing system 104 and then produce a magnetic field angle change. When the sensing apparatus 103 is impacted by the magnetic induction strength change of the magnet apparatus 102, the sensing apparatus 103 may produce an inductive electrical signal. As an exemplary embodiment, the sensing apparatus 103 may comprise a three-axle Hall element or a magneto-resistive sensor, for producing an inductive electrical signal in response to a magnetic field angle change induced by a magnetic induction strength change. More specifically, the sensing apparatus 103 may comprise a current-carrying semi-conductor membrane, which may produce an inductive electrical signal perpendicular to a current direction when being subjected to a magnetic induction strength change/magnetic field change perpendicular to the membrane surface. Within a gap between the magnet apparatus 102 and the sensing apparatus 103, the magnetic induction strength/magnetic field changes along a three-dimensional coordinate (Bx, By, Bz). The sensing apparatus 103 is usually designed to detect a two-dimensional magnetic field change along Bx or By (in the figure, the three-dimensional coordinates Bx, By, Bz are not shown).

Figure 2A:
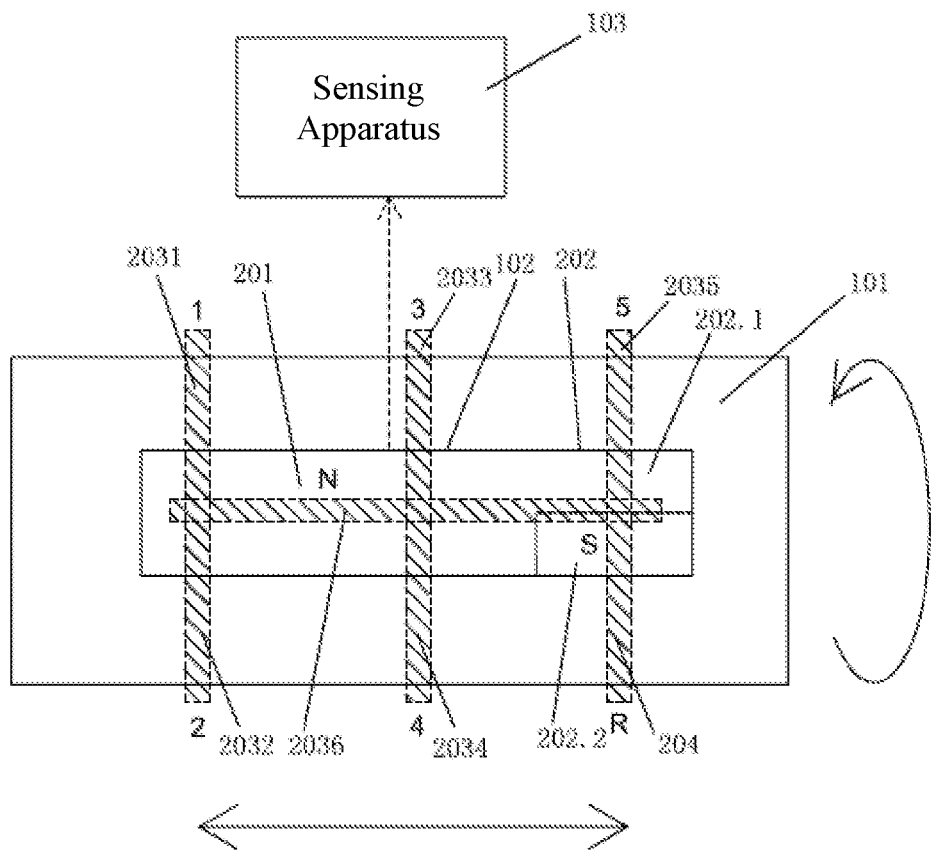
FIG. 2a is a top view of the sensing system in an embodiment of the present disclosure.

FIG. 2a is a top view of the sensing system in a first embodiment.

The sensing apparatus 103 should be shown as to be located above the magnet apparatus 102; to better illustrate the principle of the present disclosure, the sensing apparatus 103 is schematically shown as to be located at one side of the gear shaft 101 in FIG. 2a; a dotted line is used instead to reflect the actual positional relationship between the magnet apparatus 102 and the sensing apparatus 103.

As shown in FIG. 2a, the magnet apparatus 102 has a length L along a longitudinal (or length direction) of the gear shaft 101 to ensure that the sensing apparatus 103 is always within an effective detection region of the magnet apparatus 102 when the gear shaft 101 moves rectilinearly along the longitudinal direction of the gear shaft 101. The magnet apparatus 102 has a width W along a transverse direction (or width direction) of the gear shaft 101 to ensure that the sensing apparatus 103 is always within an effective detection region of the magnet apparatus 102 when the gear shaft 101 rotates about the gear shaft 103.

FIG. 2a shows relative positions between 6 gear positions of a manual gearbox vehicle and the magnet apparatus 102.

Among the directions shown in the figure, the $1^{st}$ $3^{rd}$ and $5^{th}$ gears positions are disposed on the upper side of the gear shaft 101, and the $2^{nd}$, $4^{th}$, and R gear positions are disposed on the lower side of the gear shaft 101. With the rectilinear motion of the gear shaft 101, the magnet apparatus 102 may move with the gear shaft 101 at the neutral gear position 2036. Like the manner of arranging the reference magnet 001 as will be described infra, with rotation of the gear shaft 101, the magnet apparatus 102 may make a left-right rectilinear motion with the gear shaft 101 along the axial direction of the gear shaft 101, wherein three working positions are provided in the axial direction of the fear shaft 101, i.e., $1^{st}$~$2^{nd}$ gear position, $3^{rd}$~$4^{th}$ gear position, and $5^{th}$~R gear position. When the magnet apparatus 102 is at the $1^{st}$~$2^{nd}$ gear position, upward rotation of the gear shaft 101 makes it engage to the $1^{st}$ gear position 2031, while downward rotation of the gear shaft 101 makes it engage to the $2^{nd}$ gear position 2032; when the magnet apparatus 102 is at the $3^{rd}$~$4^{th}$ gear position, upward rotation of the gear shaft 101 makes it engage to the $3^{rd}$ gear position 2033, while downward rotation of the gear shaft 101 makes it engage to the $4^{th}$ gear position 2034; when the magnet apparatus 102 is at the $5^{th}$~R gear position, upward rotation of the gear shaft 101 makes it engage to the $5^{th}$ gear position 2035, while downward rotation of the gear shaft 101 makes it engage to the R gear position 204.

Figure 2B:
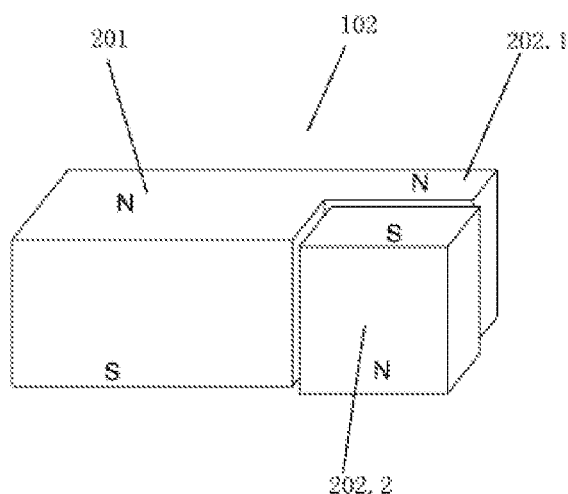
FIG. 2b is a stereoscopic structural schematic diagram of a magnet apparatus in an embodiment of the present disclosure.

Further, as shown in FIGS. 2a and 2b, along the rectilinear motion direction (i.e., length direction), the magnet apparatus 102 includes a first length region magnet 201 and a second length region magnet 202, while the second length region magnet 202 is further partitioned into a first portion 202.1 and a second portion 202.2 along the transverse direction, the first portion 202.1 and the first length region 201 being of an integral structure with an identical magnetic polarity, the polarity of the second portion 202.2 being reverse to that of the first portion 202.1 and the first length region 201. For the convenience of illustration, it is shown in FIG. 2b that the second portion 202.2 is separated from the first portion 202.1 and the first length region 201. In reality, the magnet apparatus 102 is of an integral structure.

Moreover, the second portion 202.2 corresponds to the reverse gear position 204, such that the magnetic field of the reverse gear position 204 is different from those of other gear positions. An area of the second portion 202.2 is ⅙ of the area of the first length region 201.

In this embodiment, the magnetic field environment of the reverse gear position 204 is distinguished by reversing the polarity of the second portion 202.2. In reality, the same objective may also be achieved by other means, as long as it makes the magnetic field of the reverse gear position 204 different. For example, in the second embodiment, the second portion 202.2 is absent. All in all, it is only required to make the magnetic field of the first length region different from that of the second portion.

In this embodiment, arrangement of the magnet apparatus 102 on the gear shaft 101 should guarantee the following positional relationships: when the magnet apparatus 102 is located at the $1^{st}$~$2^{nd}$ gear positions or $3^{rd}$~$4^{th}$ gear positions or the $5^{th}$ gear position, a detection position of the sensing unit 401 of the sensing apparatus 103 is closer to the first length region magnet 201 than the second length region magnet 202; when the magnet apparatus 102 is located at the R gear position 204, the detection position of the sensing unit 401 of the sensing apparatus 103 is closer to the second portion 202.2 of the second length region magnet 202 than the first length region magnet 201.

Figure 2C:
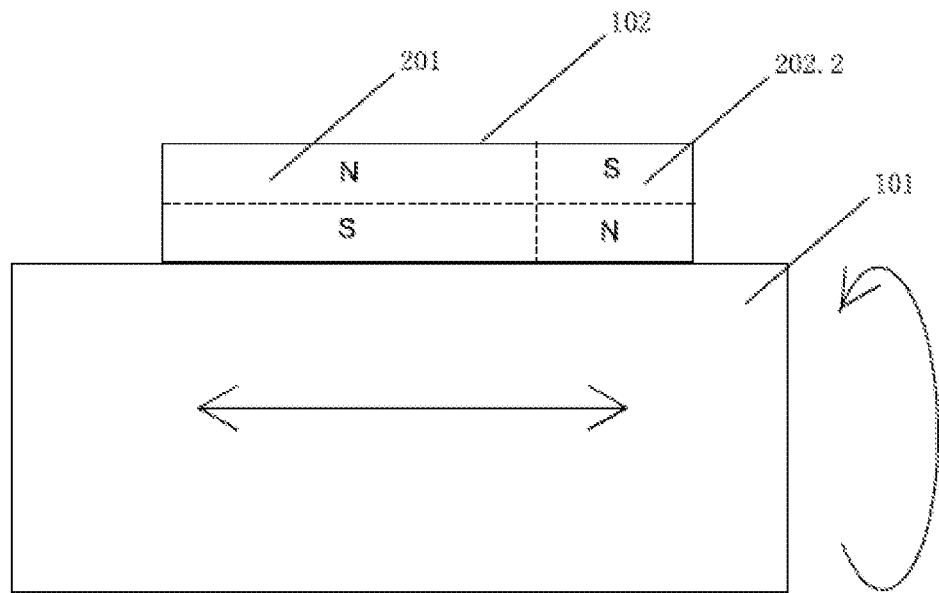
FIG. 2c is a side view showing one side of a gear shaft and a magnet apparatus in an embodiment of the present disclosure.
Figure 2D:
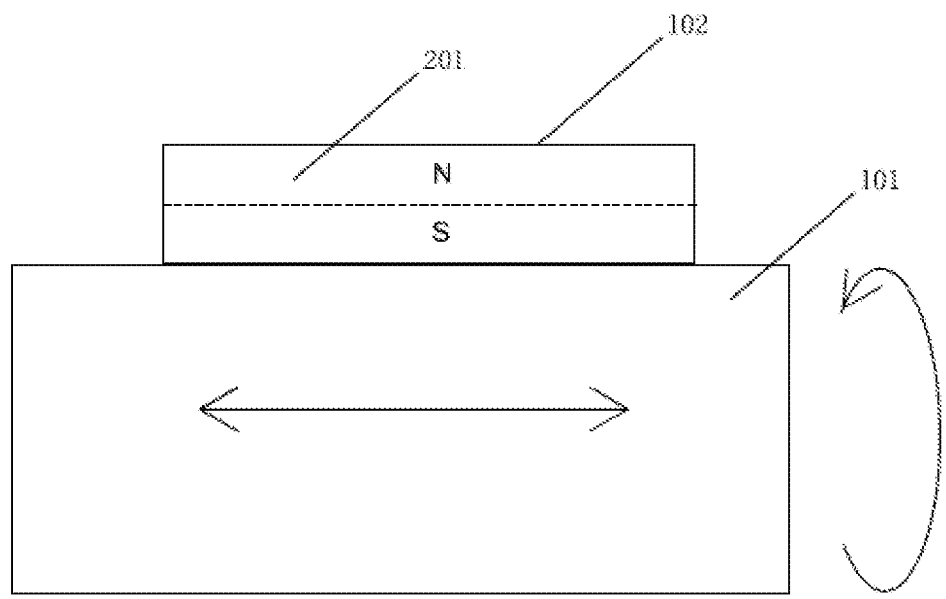
FIG. 2d is a side view showing another side of a gear shaft and a magnet apparatus in an embodiment of the present disclosure.

FIG. 2b is a stereoscopic structural schematic diagram of a magnet apparatus in a first embodiment of the present disclosure; FIG. 2c and FIG. 2d show the gear shaft 101 and the magnet apparatus 102 from two sides, respectively.

As shown in FIG. 2c, from the perspective of the front side, it may be seen that the magnet apparatus 102 includes, along the length direction, a first length region magnet 201 and a second portion 202.2 of the second length region magnet 202; a magnetic field direction of the first length region magnet 201 is opposite to that of the second portion 202.2 of the second length region magnet 202. For example, as exemplarily shown in FIG. 2b, the first length region magnet 201 is arranged such that its south pole (S) is attached to a surface of the gear shaft 101, while its opposite north pole (N) faces the sensing apparatus 103; the second portion 202.2 is arranged such that its north pole (N) is attached onto the surface of the gear shaft 101, while its opposite south pole (S) faces the sensing apparatus 103. As shown in FIG. 2c, from the perspective of a rear side, only the first length region 201 can be seen, whose south pole (S) is attached onto the surface of the gear shaft 101, while its opposite north pole (N) faces the sensing apparatus 103.

The magnet apparatus 102 differs from the reference magnet 001 in that the reference magnet 001 does not have a second portion 202.2 with a different magnetic field, while the magnet apparatus 102 includes a first length region 201 and a second portion 202.2 with a different magnetic field; therefore, the first length region 201 as well as the first portion 202.1 of the second length region magnet 202 may also be regarded as the reference magnet 001.

Because the magnet apparatus 102 includes the first length region magnet 201 and the second portion 202.2, the magnetic field direction of the first length region magnet 201 being identical to that of a corresponding position of the reference magnet 001, the magnetic field direction of the second portion 202.2 being opposite to the magnetic field direction of the corresponding portion of the reference magnet 001, upon sensing, during the process in which the magnet apparatus 102 moves with the gear shaft 101, an inductive electrical signal outputted by the sensing apparatus 103 by sensing a magnetic induction intensity change of the first length region 201 is substantially identical to a pre-stored reference inductive electrical signal at the corresponding position of the reference magnet 001 (see FIG. 7), while an inductive electrical signal outputted by the sensing apparatus 103 by sensing a magnetic induction intensity change of the second portion 202.2 is different from the pre-stored reference inductive electrical signal at the corresponding position of the reference magnet 001. In other words, because the detection position of the sensing unit 401 of the sensing apparatus 103 is closer to the second portion 202.2 than the first length region magnet 201 when the magnet apparatus 102 is at the R gear position 204 while the detection position is closer to the first length region 201 when the magnet apparatus 102 is at other gear positions, the sensing apparatus 103 mainly senses the magnetic induction strength change of the second portion 202.2 when the magnet apparatus 102 is at the R gear position 204, such that the outputted inductive electrical signal is different from the pre-stored reference inductive electrical signal at the corresponding position of the reference magnet 001. Through such a sensing method, the R gear is distinguished from the forward gears position overlapping with the R gear position (i.e., $2^{nd}$ gear position 2032 and $4^{th}$ gear position 2034).

Figure 5A:
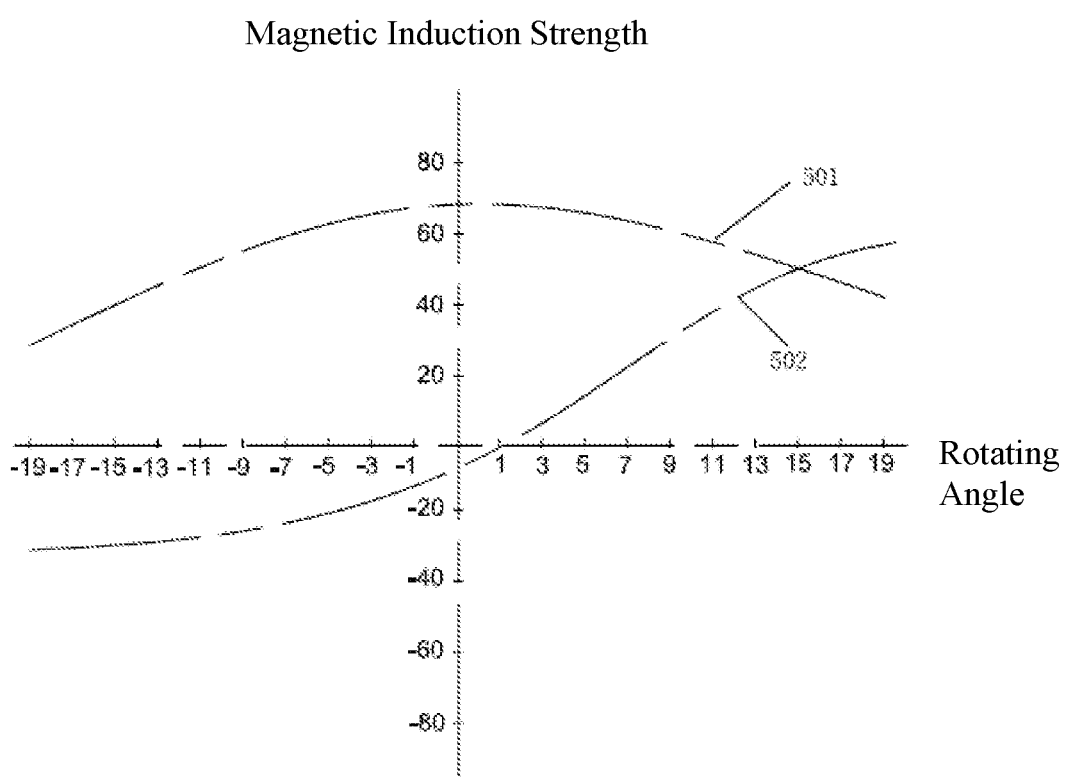
FIG. 5a is a schematic diagram of magnetic induction intensity changes of the magnet apparatus sensed by the sensing system at different rotating angles corresponding to the 1st~2nd gear positions.
Figure 5B:
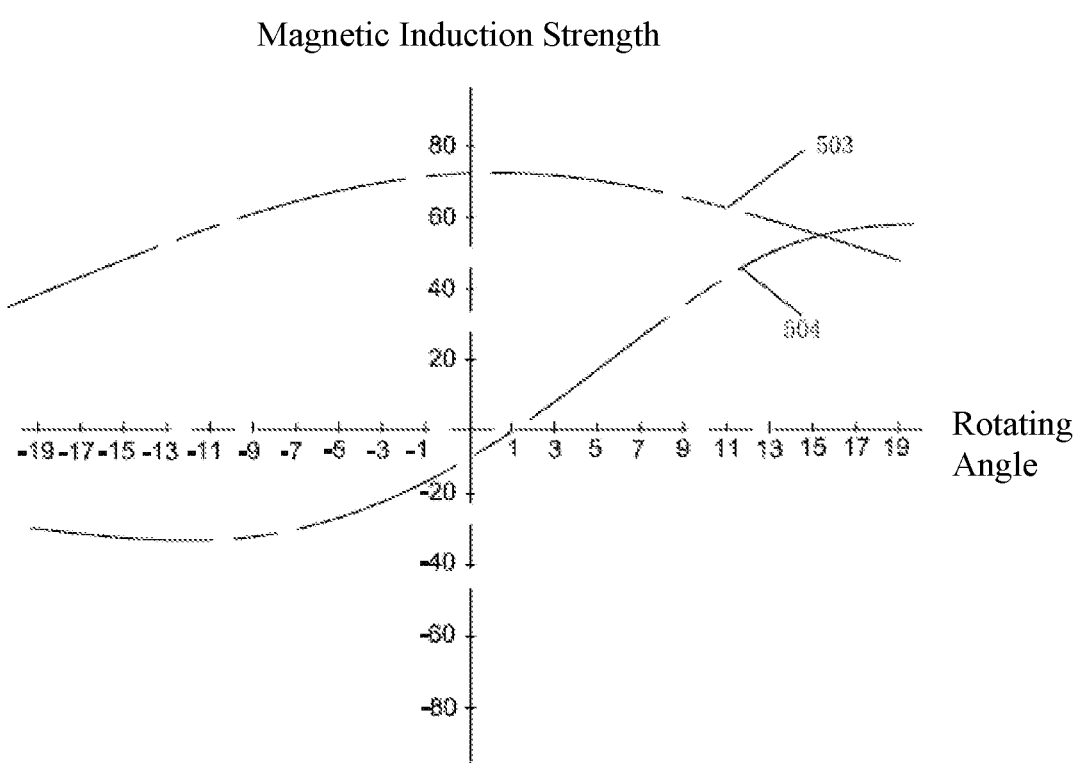
FIG. 5b is a schematic diagram of magnetic induction intensity changes of the magnet apparatus sensed by the sensing system at different rotating angles corresponding to the 3rd~4th gear positions.
Figure 5C:
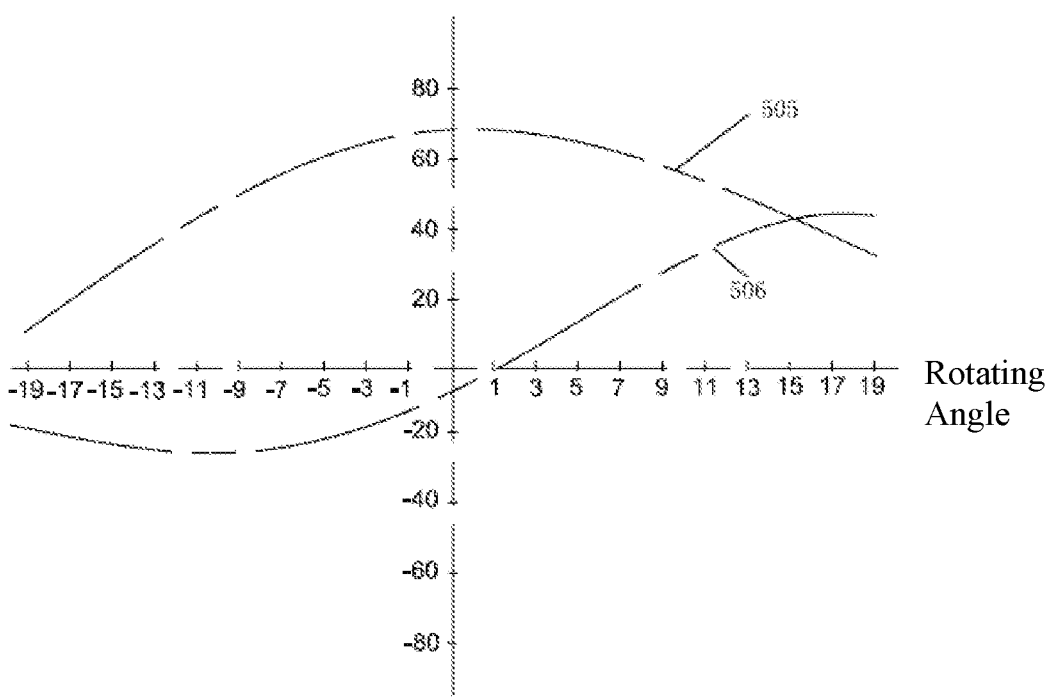
FIG. 5c is a schematic diagram of magnetic induction intensity changes of the magnet apparatus sensed by the sensing system at different rotating angles corresponding to the 5th~R gear positions.

Specifically, schematic curves in FIGS. 5a, 5b, and 5c may be derived by sensing the magnetic induction strength change when the magnet apparatus 102 continuously rotates with the gear shaft 101 using the same sensing method as that of the reference magnet 001.

Figure 3A:
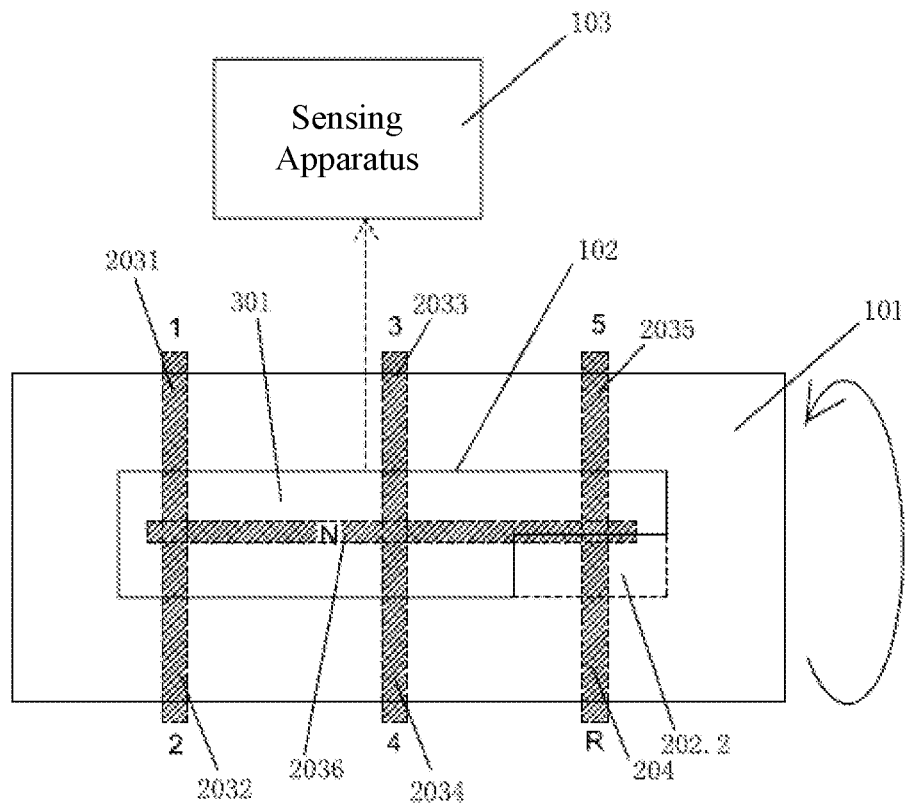
FIG. 3a is a top view of a sensing system in a second embodiment of the present disclosure.
Figure 3B:
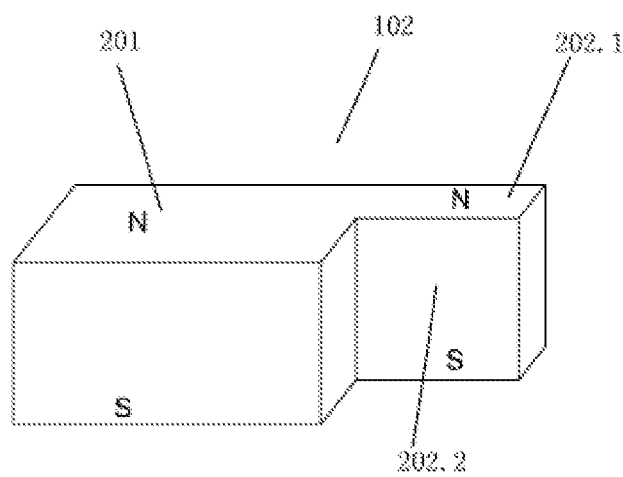
FIG. 3b is a stereoscopic structural schematic diagram of a magnet apparatus in an embodiment of the present disclosure.
Figure 3C:
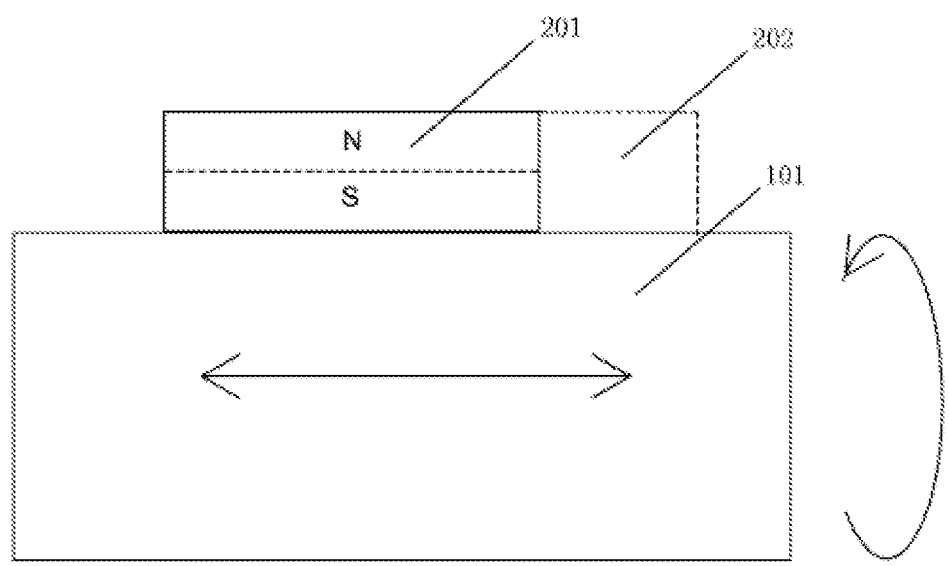
FIG. 3c is a side view showing one side of a gear shaft and a magnet apparatus in a second embodiment of the present disclosure.
Figure 3D:
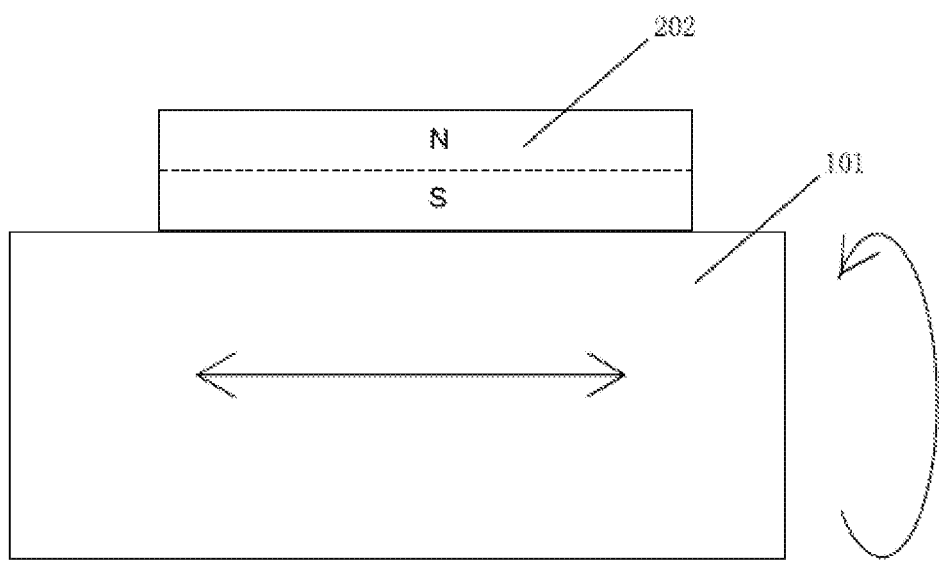
FIG. 3d is a side view showing another side of a gear shaft and a magnet apparatus in a second embodiment of the present disclosure.

FIG. 3a is a top view of the sensing system in a second embodiment of the present disclosure; FIG. 3b is a stereoscopic structural diagram of the magnet apparatus in an embodiment of the present disclosure; FIG. 3c is a side view showing one side of the gear shaft and the magnet apparatus in a second embodiment of the present disclosure; and FIG. 3d is a side view showing another side of the gear shaft and the magnet apparatus in the second embodiment of the present disclosure.

This embodiment differs from the foregoing embodiment in the arrangement of the magnet apparatus 102. Specifically, as shown in FIGS. 3a, 3b, 3c and 3d, along the rectilinear motion direction (i.e., length direction), the magnet apparatus 102 includes a first length region magnet 301 and a second length region magnet 302, while the second length region magnet 302 is further partitioned into a first portion 302.1 and a second portion 302.2 along the transverse direction.

In this embodiment, arrangement of the magnet apparatus 102 on the gear shaft 101 should also guarantee the following positional relationships: when the magnet apparatus 102 is located at the $1^{st}$~$2^{nd}$ gear positions or $3^{rd}$~$4^{th}$ gear positions or the $5^{th}$ gear position, a detection position of the sensing unit 401 of the sensing apparatus 103 is closer to the first length region magnet 301 than the second length region magnet 302; when the magnet apparatus 102 is located at the R gear position 204, the detection position of the sensing unit 401 of the sensing apparatus 103 is closer to the second length region magnet 302 than the first length region magnet 301.

The magnet apparatus 102 in this embodiment differs from the magnet apparatus in Embodiment 1 in that the second portion 302.2 of the second length region magnet 302 has no magnetic field. For example, as shown in FIGS. 3*a*-3*d*, the first length region magnet 301 and the first portion 302.1 of the second length region magnet 302 are arranged such that the south pole (S) is attached onto the surface of the gear shaft 101, while their opposite north pole (N) faces the sensing apparatus 103; the second portion 302.2 of the second length region magnet 302 is not provided with a magnet (including a recess or providing a non-magnetic material); FIG. 3*b* shows magnet apparatus 102 with the second portion 302.2 removed, the removed portion may also be provided with a non-magnetic material. Compared with the arrangement of the second portion 302.2 of the second length region magnet 302 in the first embodiment, the arrangement of the first length region magnet 301 and the first portion 302.1 of the second length region magnet 302 is more convenient and cost-saving, and the original space arrangement design of the magnet apparatus 102 may not be changed.

It needs to be noted that the first portion 202.1 of the second length region magnet 202 aligns with the first length region magnet 201 in the axial direction with the same magnetism (the smaller the difference, the better); one side of the second portion 202.2 of the second length region magnet 202 has a reverse magnetism (the larger the difference is, the better) with respect to the corresponding side of the first length region magnet 201. Other modules and sensing methods in this embodiment are identical to those in the first embodiment, which will be described later.

Figure 4:
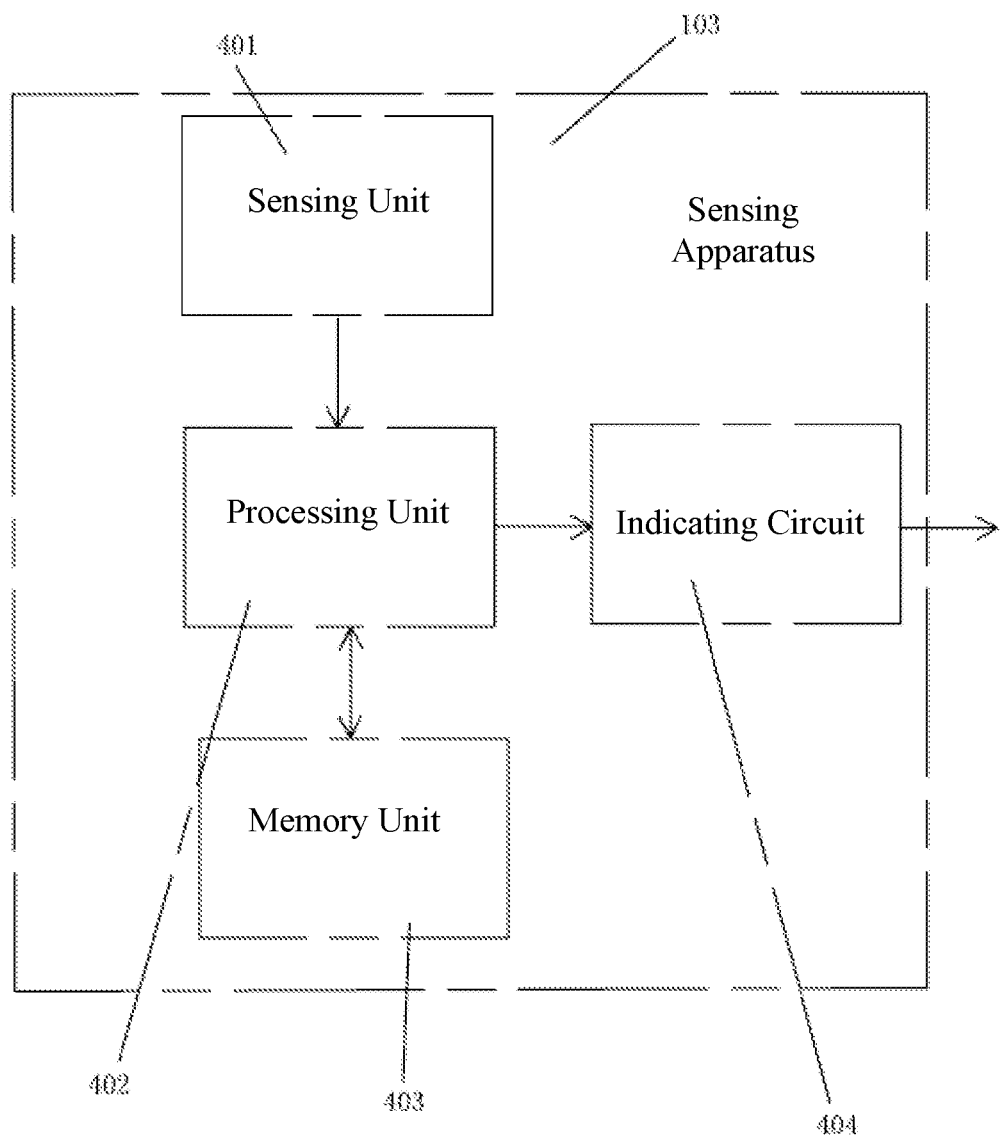
FIG. 4 is a module schematic diagram of a sensing apparatus of the present disclosure.

FIG. 4 is a module schematic diagram of a sensing apparatus 103 of the present disclosure.

As shown in FIG. 4, the sensing apparatus 103 comprises a sensing unit 401, a processing unit 402, a memory unit 403, and an indicating circuit 404. The sensing unit 401 is configured for sensing a magnetic induction strength change of the magnet apparatus 102. The memory unit 403 is configured for storing an actually sensed magnetic induction strength change signal and the reference inductive electrical signals of the reference magnet 001 at different positions. The processing unit 402 transduces the magnetic induction strength change sensed by the sensing unit 401 into an actually sensed inductive electrical signal, compares the actually sensed inductive electrical signal against the reference inductive electrical signals to thereby determine a position of the gear shaft 101, and when the gear shaft 101 is at a neutral gear position or reverse gear position, controls the indicating circuit 404 to emit a neutral gear position or reverse gear position signal. The indicating circuit 404 emits, under control by the processing unit 402, a neutral gear position or reverse gear position signal to the external of the sensing apparatus 103.

Prior to actual sensing, reference inductive electrical signals need to be stored, such that when actually sensing, the actually sensed inductive electrical signal is compared with the reference inductive electrical signals to determine the position of the gear shaft 101. The reference inductive electrical signals are obtained through experiments on the magnet apparatus 001 and stored in advance.

FIG. 5*a* is a schematic diagram of magnetic induction intensity changes of the magnet apparatus sensed by the sensing system at different rotating angles corresponding to the $1^{st}$~$2^{nd}$ gear positions; FIG. 5*b* is a schematic diagram of magnetic induction intensity changes of the magnet apparatus sensed by the sensing system at different rotating angles corresponding to the $3^{rd}$~4th gear positions; and FIG. 5*c* is a schematic diagram of magnetic induction intensity changes of the magnet apparatus sensed by the sensing system at different rotating angles corresponding to the $5^{th}$~R gear positions.

As shown in FIGS. 5*a* and 5*b*, the first curve 501 represents a magnetic induction strength change curve of the magnet apparatus 102 along the Bx dimension sensed by the sensing unit 401 when the magnet apparatus 102 moves with the gear shaft 101 between the $1^{st}$ gear position 2031 and the $2^{nd}$ gear position 2032; the second curve 502 represents a magnetic induction strength change curve of the magnet apparatus 102 along the By dimension sensed by the sensing unit 401 when the magnet apparatus 102 moves with the gear shaft 101 between the $1^{st}$ gear position 2031 and the $2^{nd}$ gear position 2032; the third curve 503 represents a magnetic induction strength change curve of the magnet apparatus 102 along the Bx dimension sensed by the sensing unit 401 when the magnet apparatus 102 moves with the gear shaft 101 between the $3^{rd}$ gear position 2033 and the $4^{th}$ gear position 2034; and the fourth curve 504 represents a magnetic induction strength change curve of the magnet apparatus 102 along the By dimension sensed by the sensing unit 401 when the magnet apparatus 102 moves with the gear shaft 101 between the $3^{rd}$ gear position 2033 and the $4^{th}$ gear position 2034. Because the sensing unit 401 of the sensing apparatus 103 mainly senses the magnetic induction strength change of the first length region 201 when the gear shaft 101 moves across the $1^{st}$~$2^{nd}$ gear position and the $3^{rd}$~$4^{th}$ gear position, while the magnetic field direction of the first length region 201 is substantively identical to the magnetic field direction of the corresponding position of the reference magnet 201; therefore, the first curve 501 is substantially identical to the third curve 503, and the second curve 502 is substantially identical to the fourth curve 504.

By computing the first curve 501 and the second curve 502 based on the sensing and computing method that will be described infra, an actually sensed linear function curve substantially identical to the reference curve 600 as shown in FIG. 6 may be derived; by computing the third curve 503 and the fourth curve 504, an actually sensed linear function curve substantially identical to the reference curve 600 as shown in FIG. 6 may be also derived.

As shown in FIG. 5*c*, the fifth curve 505 represents a magnetic induction strength change curve of the magnet apparatus 102 along the Bx dimension sensed by the sensing unit 401 when the magnet apparatus 102 moves with the gear shaft 101 between the $5^{th}$ gear position 2035 and the R gear position 204; and the sixth curve 506 represents a magnetic induction strength change curve the magnet apparatus 102 along the By dimension sensed by the sensing unit 401 when the magnet apparatus 102 moves with the gear shaft 101 between the $5^{th}$ gear position 2035 and the R gear position 204. During the gear shaft 101 moves between $5^{th}$ gear position and the R gear position, the sensing apparatus 103 mainly senses the magnetic induction strength change of the first length region magnet 201 when the gear shaft 101 closes to the $5^{th}$ gear position; the sensing apparatus 103 mainly senses the magnetic induction strength change of the second portion 202.2 when the gear shaft 101 rotates from the neutral gear position 2036 to the R gear position 204, wherein the magnetic field direction of the second position 202.2 is reversal to that of the corresponding position of the reference magnet 001. Therefore, as shown in FIG. 5*c*, numerical values of the inductive electrical signals at the left ends (i.e., R gear position) of the fifth curve 505 and the sixth curve 506 are substantially different from the numerical values of the inductive electrical signals at the left ends of the first curve 501 and the second curve 502, while the remaining portions of the curves are substantially identical to those of the first curve 501 and the second curve 502. Further, by computing the fifth curve 505 and the sixth curve 506 based on the sensing and computing method that will be described infra, an actually sensed curve 602 may be derived, as shown in FIG. 6.

Figure 6A:
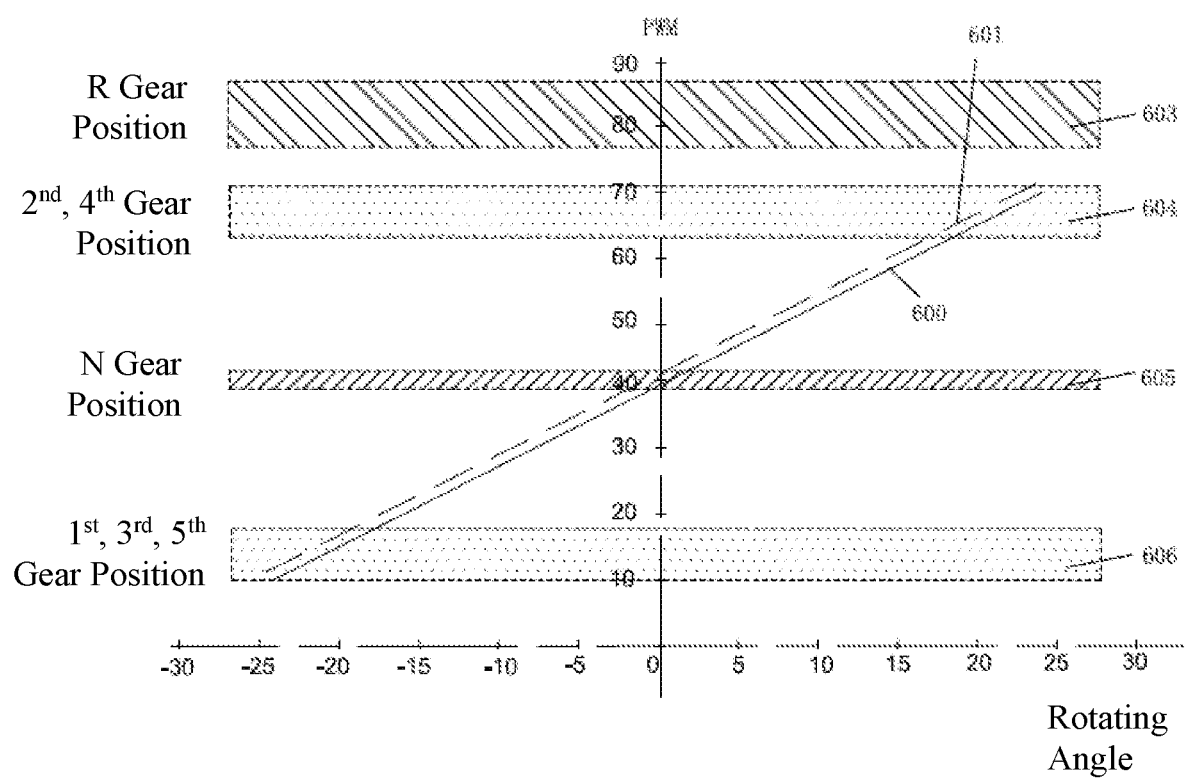
FIG. 6A is a schematic diagram where the sensing apparatus transduces a magnetic field signal into an induced electrical signal at different rotating angles corresponding to the 1st gear position, 2nd gear position, 3rd gear position, and 4th gear position.
Figure 6B:
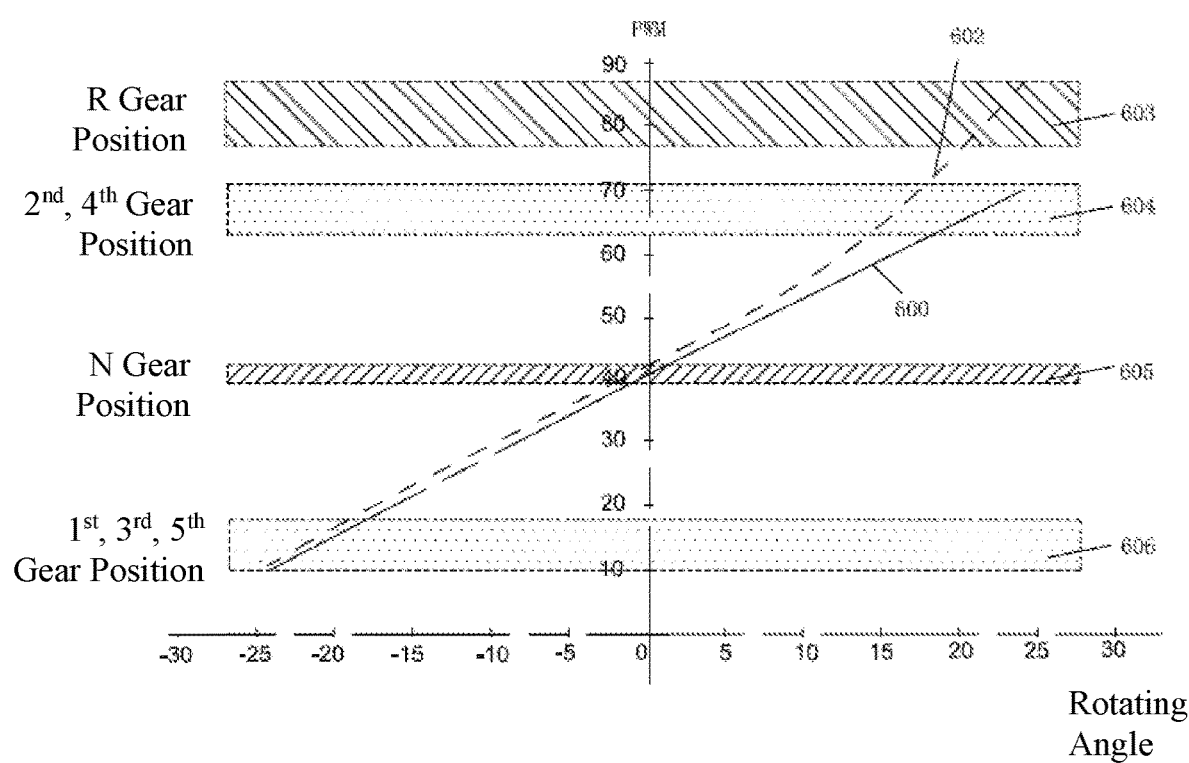
FIG. 6B is a schematic diagram where the sensing apparatus transduces a magnetic field signal into an induced electrical signal at different rotating angles corresponding to the 5th gear position and the R gear position.

FIG. 6A is a schematic diagram where the sensing apparatus transduces a magnetic field signal into an induced electrical signal at different rotating angles corresponding to the $1^{st}$ gear position, $2^{nd}$ gear position, $3^{rd}$ gear position, and $4^{th}$ gear position; and FIG. 6B is a schematic diagram where the sensing apparatus transduces a magnetic field signal into an induced electrical signal at different rotating angles corresponding to the $5^{th}$ gear position and the R gear position.

In FIGS. 6A and 6B, the transverse coordinate represents a rotating angle, and the longitudinal coordinate represents an inductive electrical signal outputted by the sensing apparatus 103. The present disclosure adopts the PWM (Pulse Width Modulation); but other signal manners known in the art may also be used, e.g., a voltage signal (V), a Single Edge Nibble Transmission (SENT) signal, or a Serial Peripheral Interface (SPI), etc. In FIGS. 6A and 6B, the reference curve 600 represents inductive electrical signals at different positions of the reference magnet 001. The reference curve 600 is a linear function curve. Specific computing manner of the reference curve 600 is provided below.

The first curve 501 represents a magnetic induction strength change curve of the sensing magnet 102 along the Bx dimension sensed by the sensing unit 401 in the sensing apparatus 103 when the sensing magnet 102 moves with the gear shaft 101 between the $1^{st}$ gear position 2031 and the $2^{nd}$ gear position 2032, and the first curve 501 is a cosinoidal function curve. The second curve 502 represents a magnetic induction strength change curve of the sensing magnet 102 along the By dimension sensed by the sensing apparatus 103 when the sensing magnet 102 moves with the gear shaft 101 between the $1^{st}$ gear position 2031 and the $2^{nd}$ gear position 2032, and the first curve 502 is a sinusoidal function curve.

The processing unit 402 stores the first curve 501 and the second curve 502 sensed by the sensing unit 401 into the memory unit 403, and then transduces the first curve 501 and the second curve 502 into a first half segment of the inductive electrical signal of a linear function reference curve as shown in FIG. 6.

The processing unit 402 performs computation through the following manner:

(1) measuring a two-dimensional relationship of By, Bx versus the mechanical stroke. Measuring, in advance, the actual mechanical motion positions of the gear shaft 101 corresponding to a plurality of groups of magnetic induction intensities By and Bx.

(2) establishing a two-dimensional relationship between the magnetic field angle Θ and the mechanical stroke of the gear shaft 101:

$$\Theta = a\tan2(By/Bx) * 180/\pi;$$

(3) establishing and outputting a function relationship between the inductive electrical signal (V) and the magnetic field angle Θ:

$$V = \text{slope(Angle calibrated voltage)} * \text{Angle} + \text{intercept} \\ \text{(Angle calibrated voltage)};$$

In this way, the output curve shown in FIG. 6 may be derived, where the slope(Angle calibrated voltage) function represents the slope of the fitted curve of the output voltage value versus the calibrated angle; the intercept(Angle calibrated voltage) function represents an intercept of the fitted curve of the output voltage versus the calibrated angle; Angle represents the magnetic field angle Θ, and Angle calibrated voltage represents an angle calibrated voltage.

Because two-dimensional linear relationship between the mechanical stroke and the output electrical signal V may be obtained for the forward gear positions and the reverse gear position, respectively to establish a plurality of groups of two-dimensional relationship arrays, whether the gear shaft is currently at a forward gear position or at the reverse gear position may be determined by determining in which group of the two-dimensional relationships the measured electrical signal V' falls, which will be detailed infra.

Likewise, the third curve 503, the fourth curve 504, the fifth curve 505, and the sixth curve 506 are transduced into the inductive electrical signals in conformity with the reference curve 600 of linear function shown in FIG. 6. For the sensing magnet 102, the magnetic induction strength change sensed by the sensing apparatus 103 with respect to different rotating angles corresponding to the $3^{rd} \sim 4^{th}$ gear positions and the $5^{th}$-R gear positions is identical to the magnetic induction strength change sensed with respect to different rotating angles corresponding to the $1^{st} \sim 2^{nd}$ gear positions; therefore, the same reference curve 600 may also be generated with respect to the $3^{rd} \sim 4^{th}$ gear positions and the $5^{th}$-R gear positions.

Because during a rotating motion of the gear shaft 101, the rotating angles of the $1^{st}$ gear position 2031, $3^{rd}$ gear position 2033, and 5th gear position 2035 are identical and the rotating angles of the $2^{nd}$ gear position 2032, the $4^{th}$ gear position 2034, and the R gear position 204 are identical; therefore, the actually sensed curve 601 in FIG. 6A is substantially overlapping with or parallel to the reference curve 600.

The reference inductive electrical signals of the reference magnet 001 sensed by the sensing apparatus 103 at the $1^{st}$ gear position, the $3^{rd}$ gear position, and the $5^{th}$ gear position are identical, i.e., the PWM value is at a first numerical value region 606; the reference electrical signals at the $2^{nd}$ gear position, $4^{th}$ gear position, and R gear position are identical, i.e., the PWM value is at a third numerical value region 604. The reference inductive electrical signal of the reference magnet 001 sensed by the sensing apparatus 103 at the neutral gear position is at a second numerical value region 605.

It may be seen from the arrangement and sensing of the reference magnet 001 that the sensing apparatus 103 may distinguish between the inductive electrical signal from the neutral gear position 2036 and the inductive electrical signals from other gear positions but can hardly distinguish between inductive electrical signal from the R gear position 204 and the inductive electrical signals from the forward gear positions overlapping with the R gear position 204 (e.g., $2^{nd}$ gear position 2032, $4^{th}$ gear 2034 position).

It is further needed to determine whether the gear shaft 101 is at the R gear position 204 or at a forward gear position overlapping with the R gear position 204.

As shown in FIG. 6B, a left half segment of the actually sensed curve 602 is substantially communicative with the reference curve 600; however, after it passes through the neutral gear position, with increase of the angle, the actually sensed curve 602 gradually deviates from the reference curve 600; in this embodiment, the inductive electrical signal of the actually sensed curve 602 is greater than the inductive electrical signal value of the reference curve 600 at a same angle position, while when the deviation exceeds a certain scope (i.e., the inductive electrical signal is greater than a threshold), it indicates that the gear shaft 101 moves to the R gear position 204.

It may be seen from the description above that to determine whether the gear shaft 101 is at the R gear position 204 or at a forward gear position overlapping with the R gear position 204 (e.g., $2^{nd}$ gear position 2032, $4^{th}$ gear position 2034), a difference between the actually sensed inductive electrical signals, which are of a specific rectilinear motion position and a specific rotating motion position, and the simulated inductive electrical signals, which are of the gear shaft 101 at the specific rectilinear motion position and the specific rotating motion position, is compared against a threshold; if the difference is greater than the threshold, it is determined that the gear shaft 101 is at the R gear position 204; if the difference is smaller than or equal to the threshold, it is determined that the gear shaft 101 is at a forward gear position overlapping with the R gear position 204.

Therefore, as shown in FIG. 6B, based on the actually sensed curve 602, when a difference between the output PWM numerical value and a numerical value in the third numerical value region 604 is greater than the threshold (i.e., the numerical value is within a fourth numerical value region 603), it indicates that the gear shaft 101 is at the R gear position.

Operation of sensing R position is provided below:

In actual use, when the processing unit 402 computes that the inductive electrical signal is within the range of neutral gear position reference inductive electrical signal (i.e., within the second numerical value region 605), the processing unit 402 indicates the indicating circuit 404 to produce a neutral gear position signal, specific steps of which are provided below:

In actual use, when the gear shaft 101 is making a rectilinear motion, the sensing apparatus 103 senses the magnetic induction strength and/or magnetic field distribution of the magnet apparatus 102, detects and generates two magnetic induction strength signals having a sinusoidal shape and a cosine shape.

According to the foregoing mathematic equation, the processing unit 402 transduces the two magnetic induction strength signals having the sinusoidal shape and the cosine shape into an inductive electrical signal (an output signal or a numerical value). The inductive electrical signal should fall on the actually sensed curve 602 shown in FIG. 6B.

The processing unit 402 compares the resulting inductive electrical signal against the neutral gear reference inductive electrical signal range (i.e., the second numerical value 605 region) stored in the memory unit 403. When the processing unit 402 determines that the resulting inductive electrical signal is within the second numerical value range 605, the processing unit 402 determines that the gear shaft 101 is at the neutral gear position.

When the processing unit 402 determines that the gear shaft 101 is at the neutral gear position, the processing unit 402 indicates the indicating circuit 404 to emit a neutral gear position signal to the external of the sensing apparatus 103.

Specific operation of sensing R gear position is provided below:

In actual use, the processing unit 402 computes an inductive electrical signal; when a difference between the inductive electrical signal and the numerical value in the third numerical value region 604 is greater than the threshold and the inductive electrical signal is within the range of the R gear reference inductive electrical signal (i.e., within the fourth numerical value region 603), the processing unit 402 indicates the indicating circuit 404 to generate a R gear position signal, specific steps of which are provided below:

In actual use, when the gear shaft 101 is at the $5^{th}$~R gear positions and rotates to the left to engage to the R gear position 204 from the neutral gear position 2036, the sensing apparatus 103 senses the magnetic induction strength and/or magnetic field distribution of the magnet apparatus 102, detects and generates two magnetic induction strength signals having a sinusoidal shape and a cosine shape.

According to the foregoing mathematic equation, the processing unit 402 transduces the two magnetic induction strength signals having the sinusoidal shape and the cosine shape into an inductive electrical signal (an output signal or a numerical value). The inductive electrical signal should fall on the actually sensed curve 602 shown in FIG. 6B.

The processing unit 402 compares the resulting inductive electrical signal against the value in the third numerical value region 604 (e.g., taking the maximum value in the third numerical value region 604, or sequentially compared against all values in an ascending order) stored in the memory unit 403. When the processing unit 402 determines that a difference between the resulting inductive electrical signal and the numerical value in the third numerical value region 604 is greater than the threshold and the inductive electrical signal is within the range of the R gear reference inductive electrical signal (i.e., within the fourth numerical value region 603), the processing unit 402 determines that the gear shaft 101 is at the R gear position. When the processing unit 402 determines that a difference between the resulting inductive electrical signal and the numerical value in the third numerical value region 604 is smaller than or equal to the threshold, the processing unit 402 determines that the gear shaft 101 is at a forward gear position overlapping with the R gear position 204.

When the processing unit 402 determines that the gear shaft 101 is at the R gear position, the processing unit 402 indicates the indicating circuit 404 to emit a R gear position signal to the external of the sensing apparatus 103.

The programs, instruction sets, or data for performing the above operations of sensing the neutral position and R gear position may be stored in the memory unit 403 and may be executed or invoked by the processing unit 402.

Figure 7:
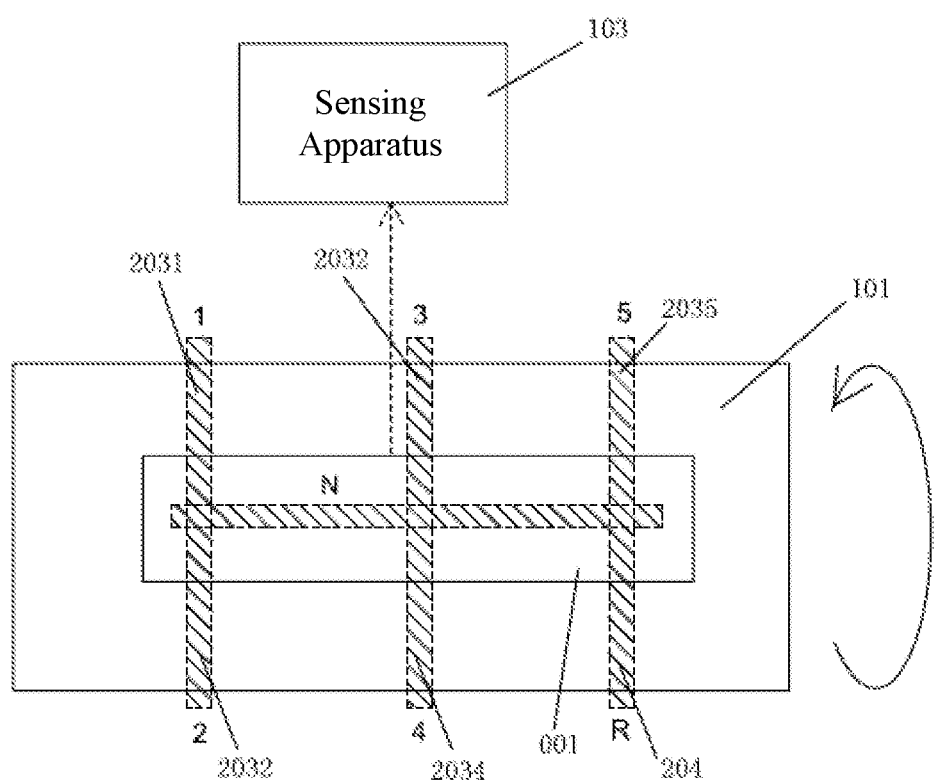
FIG. 7 is a top view of the sensing system utilizing a reference magnet of the present disclosure.

FIG. 7 is a top view of the sensing system utilizing a reference magnet of the present disclosure.

The sensing apparatus 103 should be shown as to be located above the reference magnet 001; to better illustrate the principle of the present disclosure, the sensing apparatus 103 is schematically shown as to be located at one side of the gear shaft 101 in FIG. 7; a dotted line is used instead to reflect the actual positional relationship between the reference magnet 001 and the sensing apparatus 103. As shown in FIG. 7, the reference magnet 001 is arranged as a whole such that its south pole (S) is attached onto the surface of the gear shaft 101, while its opposite north pole (N) faces the sensing apparatus 103.

FIG. 7 shows relative positions between 6 gear positions of a manual gearbox vehicle and the reference magnet 001. The gear shaft 101 defines a plurality of forward gear positions and one reverse gear position within a stroke of rectilinear motion, where the $1^{st}$ gear position 2031, the 3rd gear position 2033, and the $5^{th}$ gear position 2035 are disposed on the upper side of the gear shaft 101, while the $2^{nd}$ gear position 2032, the $4^{th}$ gear position 2034, and the reverse gear position (R gear position) 204 are disposed on the lower side the gear shaft 101. With the rectilinear motion of the gear shaft 101, the reference magnet 102 may move with the gear shaft 101 at the neutral gear position 2036. With the rectilinear motion of the gear shaft 101, three working positions ($1^{st}$-$2^{nd}$ gear position, $3^{rd}$-$4^{th}$ gear position, and $5^{th}$-R gear position) are defined along the axial direction of the gear shaft 101. With rotation of the gear shaft 101, the reference magnet 001 may make a left-right rectilinear motion with the gear shaft 101 along the radial direction of the gear shaft 101; when the reference magnet 001 is at the $1^{st}$-$2^{nd}$ gear working position, upward rotation of the gear shaft makes it engage to the $1^{st}$ gear position 2031, while downward rotation of the gear shaft makes it engage to the $2^{nd}$ gear position 2032; when the reference magnet 001 is at the $3^{rd}$-$4^{th}$ gear working position, upward rotation of the gear shaft makes it engage to the $3^{rd}$ gear position 2033, while the downward rotation of the gear shaft makes it engage to the $4^{th}$ gear position 2032; and when the reference magnet 001 is at the $5^{th}$-R working position, upward rotation of the gear shaft makes it engage to the $5^{th}$ gear position 2035, while downward rotation of the gear shaft makes it engage to the R gear position 204. It may be seen from the description that when the gear shaft 101 is making a rotating motion with the same angle, the $1^{st}$ gear position 2031, the $3^{rd}$ gear position 2033, and the $5^{th}$ gear position overlap, and at least one forward gear position (e.g., $2^{nd}$ gear position 2032, $4^{th}$ gear position 2034) overlaps with that of the R gear position 204.

The sensing apparatus 103 senses the inductive electrical signals 601 of the reference magnet 001 at different positions when the reference magnet 001 moves with the gear shaft 101, the inductive electrical signals 601 of the reference magnet 001 at different positions will be stored in the memory unit 403 as reference inductive electrical signals.

According to the first embodiment and the second embodiment, arrangement of the first length region magnet and the second length region magnet is only required to satisfy that the magnetic induction strength of the first length region magnet is different from that of the second length region magnet.

Additionally, it needs to be noted that in other embodiments, the magnet apparatus 102 in the first embodiment and the second embodiment may be used as a reference magnet, and the reference magnet 001 in the first embodiment and the second embodiment may be used as a magnet apparatus. Meanwhile, the actually sensed curve 602 of the first embodiment and the second embodiment is used as the reference curve, and the reference curve 600 is used as the actually sensed curve.

The technical features in the respective embodiments described above may be combined in any manner. The embodiments and the accompanying drawings of the present disclosure having been described above are not for limiting the scope of the claims of the present disclosure; any embodiments implemented with the same technical means or within the scope limited in the appended claims will fall within the protection scope claimed by the applicant without departing from the scope of the present disclosure.

What is claimed is:

1. A sensing system for sensing a position of a gear shaft, the gear shaft being provided, in its axial direction, with a plurality of groups of gear positions, the plurality of groups of gear positions including a plurality of neutral gear positions arranged along the axial direction of the gear shaft and a plurality of pairs of motion gear positions oppositely arranged at two sides of the neutral gear positions, one of the motion gear positions being a reverse gear position, while the remaining being forward gear positions, the sensing system comprising:
a sensing magnet that is fixedly arranged on the gear shaft and moves with the gear shaft, wherein the sensing magnet is axially partitioned into a first length region magnet and a second length region magnet, the second length region magnet being partitioned, along a transverse direction thereof, into a first portion and a second portion, the first length region magnet having a polarity consistent across an entirety of the first length region magnet that is identical to that of the first portion of the second length region magnet, but different from that of the second portion of the second length region magnet, or no magnet being provided for the second portion of the second length region magnet; and
a sensing unit arranged to sense a magnetic field change of the sensing magnet when the sensing magnet moves with the gear shaft and to generate a corresponding inductive electrical signal, the inductive electrical signal being compared against a pre-determined reference inductive electrical signal to indicate whether the gear shaft is at a forward gear position or a reverse gear position.

2. The sensing system according to claim 1, wherein
the first length region magnet generates a first form of magnetic field change;
the second length region magnet generates a second form of magnetic field change; and
the sensing unit senses the first form of magnetic field change and the second form of magnetic field change when the sensing apparatus moves with the gear shaft, and generates the inductive electrical signal.

3. The sensing system according to claim 1, wherein the sensing system further comprises:
a memory unit configured for storing the reference inductive electrical signal sensed by the sensing unit when a reference magnet moves with the gear shaft; and
a processing unit configured for receiving the inductive electrical signal and comparing the received inductive electrical signal against the reference inductive electrical signal to determine a gear position where the gear shaft is located.

4. The sensing system according to claim 3, wherein:
when a difference between the inductive electrical signal and the reference inductive electrical signal is smaller than or equal to a threshold, it is determined that the gear shaft is at a forward gear position;
when the difference between the inductive electrical signal and the reference inductive electrical signal is greater than the threshold, it is determined that the gear shaft is at a reverse gear position.

5. The sensing system according to claim 4, wherein the sensing system further comprises:
an indicating circuit connected to the processing unit;
wherein when the processing unit determines that the gear shaft is at a forward gear position, the processing unit sets the indicating circuit to a first state; and
when the processing unit determines that the gear shaft is at the reverse gear position, the processing unit sets the indicating circuit to a second state.

6. The sensing system according to claim 3, wherein:
when a difference between the inductive electrical signal and the reference inductive electrical signal is smaller than or equal to a threshold, it is determined that the gear shaft is at a forward gear position.

7. The sensing system according to claim 3, wherein:
the reference inductive electrical signal includes a maximum value reference inductive electrical signal; and
when a difference between the inductive electrical signal and the maximum value reference inductive electrical signal is greater than the threshold, it is determined that the gear shaft is at a reverse gear position.

8. The sensing system according to claim 3, wherein:
the reference inductive electrical signal has a signal reference value, and different signal reference values represent a plurality of forward gear positions and the reverse gear position.

9. The sensing system according to claim 3, wherein the reference magnet is the first length region magnet.

10. The sensing system according to claim 1, wherein:
magnetic field directions of the first length region magnet and the first portion of the second length region magnet at a side in contact with the gear shaft are a first polarity, while magnetic field directions thereof at a side distant from the gear shaft are a second polarity; and
a magnetic field direction of the second portion of the second length region magnet at a side in contact with the gear shaft is the second polarity, while the magnetic field direction thereof at a side distant from the gear shaft is the first polarity.

11. The sensing system according to claim 1, wherein magnetic field directions of the first length region magnet and the first portion of the second length region magnet at a side in contact with the gear shaft are the first polarity, while magnetic field directions thereof at a side distant from the gear shaft are the second polarity; and
the second portion of the second length region magnet is absent of magnet or provided with a non-magnetic material.

12. The sensing system according to claim 1, wherein the first length region magnet and the first portion of the second length region magnet are of an integral structure.

13. The sensing system according to claim 1, wherein:
the sensing unit is arranged relative to the sensing magnet such that: when the gear shaft is at a selected neutral position, the sensing unit and the sensing magnet are aligned along a radial direction of the gear shaft.

14. The sensing system according to claim 1, wherein the first length region magnet and the first portion of the second length region magnet have a same polarity that is different from that of the second portion of the second length region magnet.

15. The sensing system according to claim 1, wherein the second portion of the second length region magnet is not provided with a magnet.

* * * * *